US006707801B2

(12) United States Patent
Hsu

(10) Patent No.: US 6,707,801 B2
(45) Date of Patent: Mar. 16, 2004

(54) METHOD AND APPARATUS FOR DATA TRANSPORT IN A WIRELESS COMMUNICATION SYSTEM

(75) Inventor: Raymond T. Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 195 days.

(21) Appl. No.: 09/933,977

(22) Filed: Aug. 20, 2001

(65) Prior Publication Data

US 2002/0141391 A1 Oct. 3, 2002

Related U.S. Application Data

(60) Provisional application No. 60/279,970, filed on Mar. 28, 2001.

(51) Int. Cl.[7] .................................................. H04J 3/26
(52) U.S. Cl. ........................ 370/312; 370/390; 370/432; 370/486
(58) Field of Search .............................. 370/310.2, 312, 370/328, 349, 389, 390, 392, 393, 432, 469, 471, 473, 474, 475, 485, 486, 487

(56) References Cited

U.S. PATENT DOCUMENTS

| 5,101,501 | A | | 3/1992 | Gilhousen et al. | |
|---|---|---|---|---|---|
| 6,065,061 | A | | 5/2000 | Blahut et al. | |
| 6,108,706 | A | * | 8/2000 | Birdwell et al. | 709/229 |
| 6,345,307 | B1 | * | 2/2002 | Booth | 709/247 |
| 6,510,515 | B1 | | 1/2003 | Raith | |
| 2001/0055298 | A1 | * | 12/2001 | Baker et al. | 370/349 |
| 2002/0002541 | A1 | * | 1/2002 | Williams | 705/51 |
| 2002/0097722 | A1 | * | 7/2002 | Liao et al. | 370/392 |
| 2003/0009669 | A1 | * | 1/2003 | White et al. | 713/176 |

FOREIGN PATENT DOCUMENTS

| EP | 1075118 A2 | | 2/2001 |
|---|---|---|---|
| WO | WO 00/56018 | * | 9/2000 |

OTHER PUBLICATIONS

Simpson W., "PPP in HDLC–Like Framing," RFC 1962, Jul. 1994.
Carsten Bormann et al. "Robust Header Compression (ROHC)," *Internet Engineering Task Force IETF Draft*, 1–145, Feb. 26, 2001. <URL:http//www.globecom.net/ietf/draft/draft–ietf–rohc–rtp–09.html> (retrieved on Feb. 11, 2003).
D. Farinacci et al. "Generic Routing Encapsulation (GRE)," *Network Working Group Request For Comments 2784*, 1–8, Mar. 2000. <URL:http://www.globecom.net/ieft/rec2784.html> (retrieved on Feb. 14, 2003).

* cited by examiner

Primary Examiner—Chi Pham
Assistant Examiner—Anh-Vu H Ly
(74) Attorney, Agent, or Firm—Philip Wadsworth; Kent D. Baker; Sandra L. Godsey

(57) ABSTRACT

Method and apparatus for data packet transport in a wireless transmission system supporting broadcast transmissions. Broadcast streams are provided in IP packets routed to a subscriber group. The PDSN applies an outer header to each broadcast stream frame identifying the frame as part of a multi-cast transmission. The PDSN transmits the frames to at least on PCF, wherein the PCF duplicates the received frame for each user in the subscription group, alleviating the processing of the PDSN.

11 Claims, 12 Drawing Sheets

| LAYER | PROTOCOLS AND SELECTED OPTIONS FOR SERVICE OPTION XX |
|---|---|
| APPLICATION | MPEG-4 VISUAL, EVRC AUDIO, RTP PAYLOAD TYPES |
| TRANSPORT | RTP/UDP PORT NUMBER |
| SECURITY | UNSPECIFIED |
| NETWORK | IP |
| HEADER COMPRESSION | ROHC |
| LINK | HDLC-TYPE FRAMING |
| RLP | NULL |
| MULTIPLEX | BSPM |
| PHYSICAL | BSPM |

FIG. 4

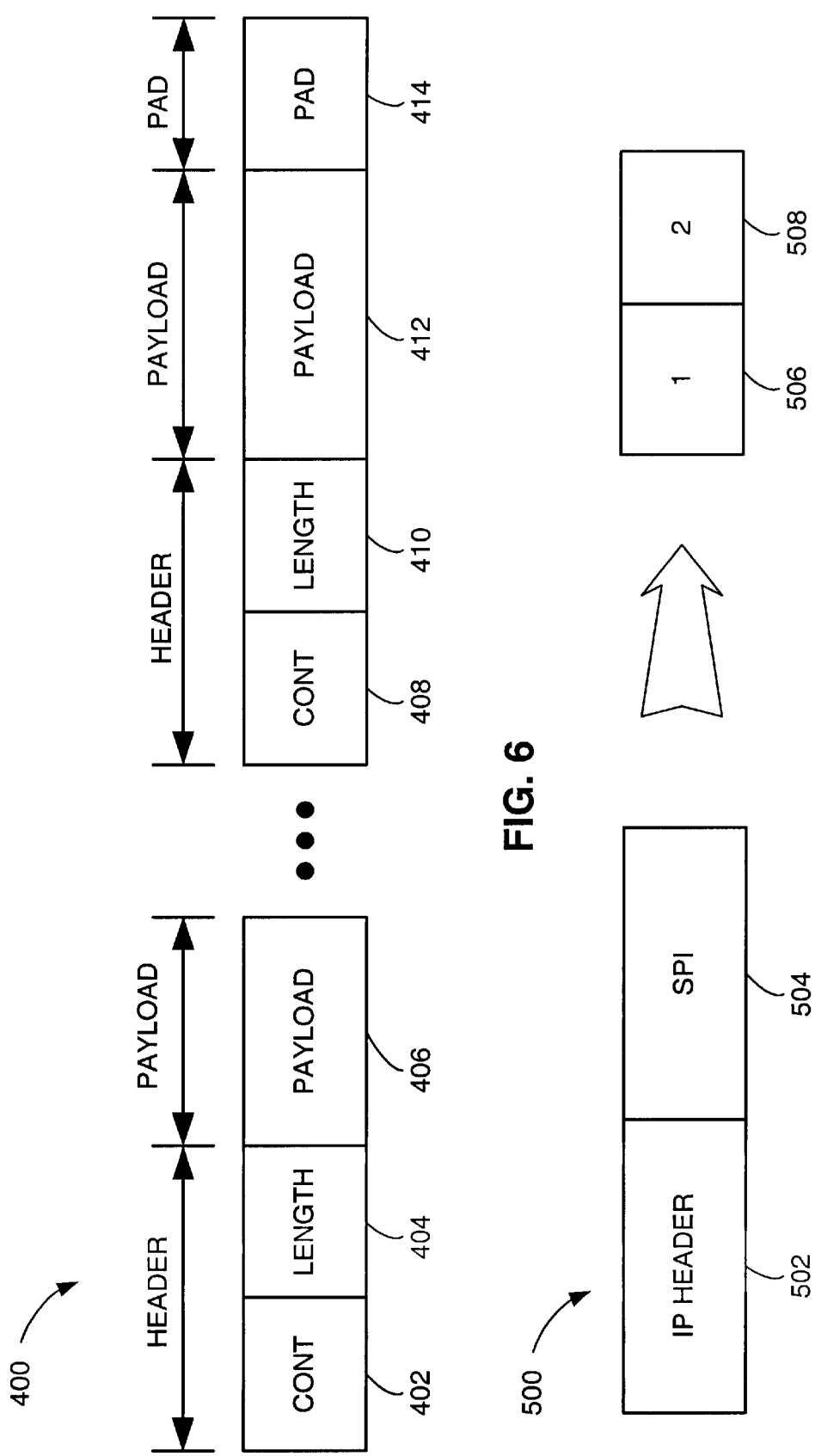

METHOD AND APPARATUS FOR DATA TRANSPORT IN A WIRELESS COMMUNICATION SYSTEM

CLAIM OF PRIORITY UNDER 35 U.S.C. §120

The present Application for Patent claims priority of U.S. Provisional Application No. 60/279,970, filed Mar. 28, 2001 assigned to the assignee hereof and hereby expressly incorporated by reference herein.

REFERENCE TO CO-PENDING APPLICATIONS FOR PATENT

The present invention is related to the following Applications for Patent in the U.S. Patent & Trademark Office:

"Method and Apparatus for Security in a Data Processing System" by Philip Hawkes et al., U.S. patent application Ser. No. 09/933,972, filed concurrently herewith and assigned to the assignee hereof, and which is expressly incorporated by reference herein;

"Method and Apparatus for Overhead Messaging in a Wireless Communication System" by Nikolai Leung, U.S. patent application Ser. No. 09/933,971, filed concurrently herewith and assigned to the assignee hereof, and which is expressly incorporated by reference herein;

"Method and Apparatus for Out-of-Band Transmission of Broadcast Service Option in a Wireless Communication System" by Nikolai Leung, U.S. patent application Ser. No. 09/934,021, filed concurrently herewith and assigned to the assignee hereof, and which is expressly incorporated by reference herein;

"Method and Apparatus for Broadcast Signaling in a Wireless Communication System" by Nikolai Leung, U.S. patent application Ser. No. 09/933,914, filed concurrently herewith and assigned to the assignee hereof, and which is expressly incorporated by reference herein;

"Method and Apparatus for Transmission Framing in a Wireless Communication System" by Raymond Hsu, U.S. patent application Ser. No. 09/933,639, filed concurrently herewith and assigned to the assignee hereof, and which is expressly incorporated by reference herein; and "Method and Apparatus for Header Compression in a Wireless Communication System" by Raymond Hsu, U.S. patent application Ser. No. 09/933.690, filed concurrently herewith and assigned to the assignee hereof, and which is expressly incorporated by reference herein.

BACKGROUND

1. Field

The present invention relates to wireless communication systems generally and specifically, to methods and apparatus for message compression in preparation for transmission in a wireless communication system.

2. Background

There is an increasing demand for packetized data services over wireless communication systems. As traditional wireless communication systems are designed for voice communications, the extension to support data services introduces many challenges. The conservation of bandwidth is the overwhelming concern for most designers. In uni-direction transmissions, such as broadcast transmissions, a single broadcast content is provided to multiple users. The users are identified by a unique identifier which is then included in addressing information. In such a system, multiple infrastructure elements may be required to duplicate the broadcast packets so as to identify each of the multiple intended receivers. The duplication of transmission signals uses up valuable bandwidth thus reducing the efficiency of the communication system, and increases the processing requirements of intermediate infrastructure elements. For a broadcast service in particular, the number of target recipients may be prohibitively large, thus creating problems of resource allocation and loss of available bandwidth.

There is a need, therefore, for an efficient and accurate method of transmitting data to multiple recipients in a wireless communication system. Further, there is a need for a method of routing broadcast data to multiple users, wherein each user is uniquely identified as a target recipient.

SUMMARY

Embodiments disclosed herein address the above stated needs by providing a method for routing IP packets in a wireless communication system, wherein an outer header identifying a multicast group is appended to each transmission frame.

In one aspect, a method for transmitting Internet Protocol packets in a wireless transmission system supporting broadcast transmissions includes generating a first transmission frame, transmitting the first transmission frame with an inner header identifying the source and destination of the first transmission frame, applying an outer header to the first transmission frame and inner header, the outer header identifying a multicast group destination for the first transmission frame.

In another aspect, an infrastructure element for processing Internet Protocol packets in a wireless transmission system supporting broadcast transmissions includes a means for receiving a first transmission frame having an inner header identifying the source and destination of the first transmission frame, a means for applying an outer header to the first transmission frame and inner header, the outer header identifying a multicast group destination for the first transmission frame, and a means for transmitting the first transmission frame with the outer header and inner header to the multicast group.

In still another aspect, in a wireless communication system supporting a broadcast service, a communication signal transmitted via a carrier wave, the communication signal having a plurality of transmission frames, each of the plurality of transmission frames includes a payload of broadcast content, an inner header identifying a source and a destination of the payload, and an outer header identifying a multicast group destination for the payload.

BRIEF DESCRIPTION OF THE DRAWINGS

FIG. 4 is a table of protocols applied to layers of a protocol stack supporting a broadcast service option in a wireless communication system.

FIG. 6 is a broadcast stream in a wireless communication system.

FIG. 7 is a header compression mapping in a wireless communication system.

DETAILED DESCRIPTION

Figure 1:
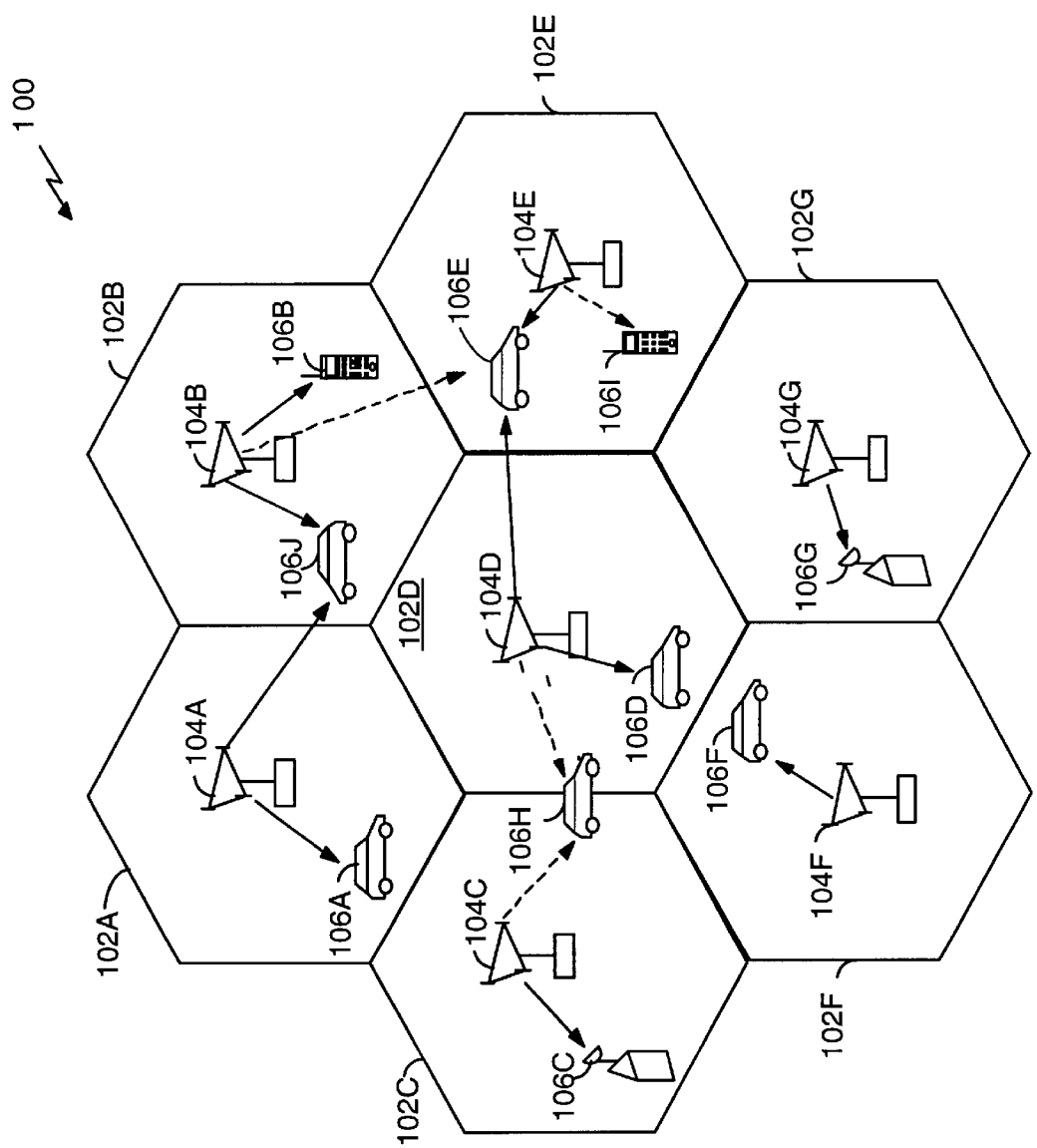
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments.

The efficient use of available bandwidth impacts the performance and breadth of the system. Toward that end, various techniques have been applied to reduce the size of overhead information transmitted along with the data or content information. For example, in a digital transmission, data is transmitted in frames. The frames may be part of a packet of data, part of a data message, or continuous frames in a stream of information, such as audio and/or video streams. Attached to each frame of data (and each packet or message) is a header containing processing information that allows the receiver to understand the information contained in the frame(s). This header information is considered overhead, i.e., processing information transmitted along with information content. The information content is referred to as the payload. While each individual header is typically much smaller than a given payload, the cumulative effect of transmitting headers impacts the available bandwidth.

The data frames are transmitted throughout the communication system via various infrastructure elements. In a conventional system, the transmission of information to multiple users requires the duplication of the information at a central packet data control point, such as a Packet Data Serving Node (PDSN). The duplication increases the processing requirements of the PDSN and wastes valuable bandwidth. The PDSN transmits the multiple copies to the base stations which forward the information to each user. The conventional approach is particularly disadvantageous in a uni-directional broadcast service, wherein many users are receiving the broadcast transmission. The PDSN in this case must make a great number of copies, apply a specific address to each copy and transmit the copies individually. In an Internet Protocol (IP) transmission, the IP header information is prepared and transmitted for each copy introducing a large overhead.

The PDSN is typically required to provide additional header information identifying each target recipient. For a broadcast service, the number of target recipients may be prohibitively large, thus creating problems of resource allocation and loss of available bandwidth.

An exemplary embodiment of a wireless communication system employs a method of data transport that reduces the bandwidth used by the infrastructure elements while satisfying the accuracy and transmission requirements of the system. In the exemplary embodiment, duplication is performed at the Base Station (BS) or Packet Control Function (PCF), freeing the PDSN or central packet data router, to send the message with a multi-cast header to each BS or PCF involved in the broadcast. The exemplary embodiment supports a uni-directional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

The following discussion develops the exemplary embodiment by first presenting a spread-spectrum wireless communication system generally. Next, the broadcast service is introduced; wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a uni-directional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System," which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
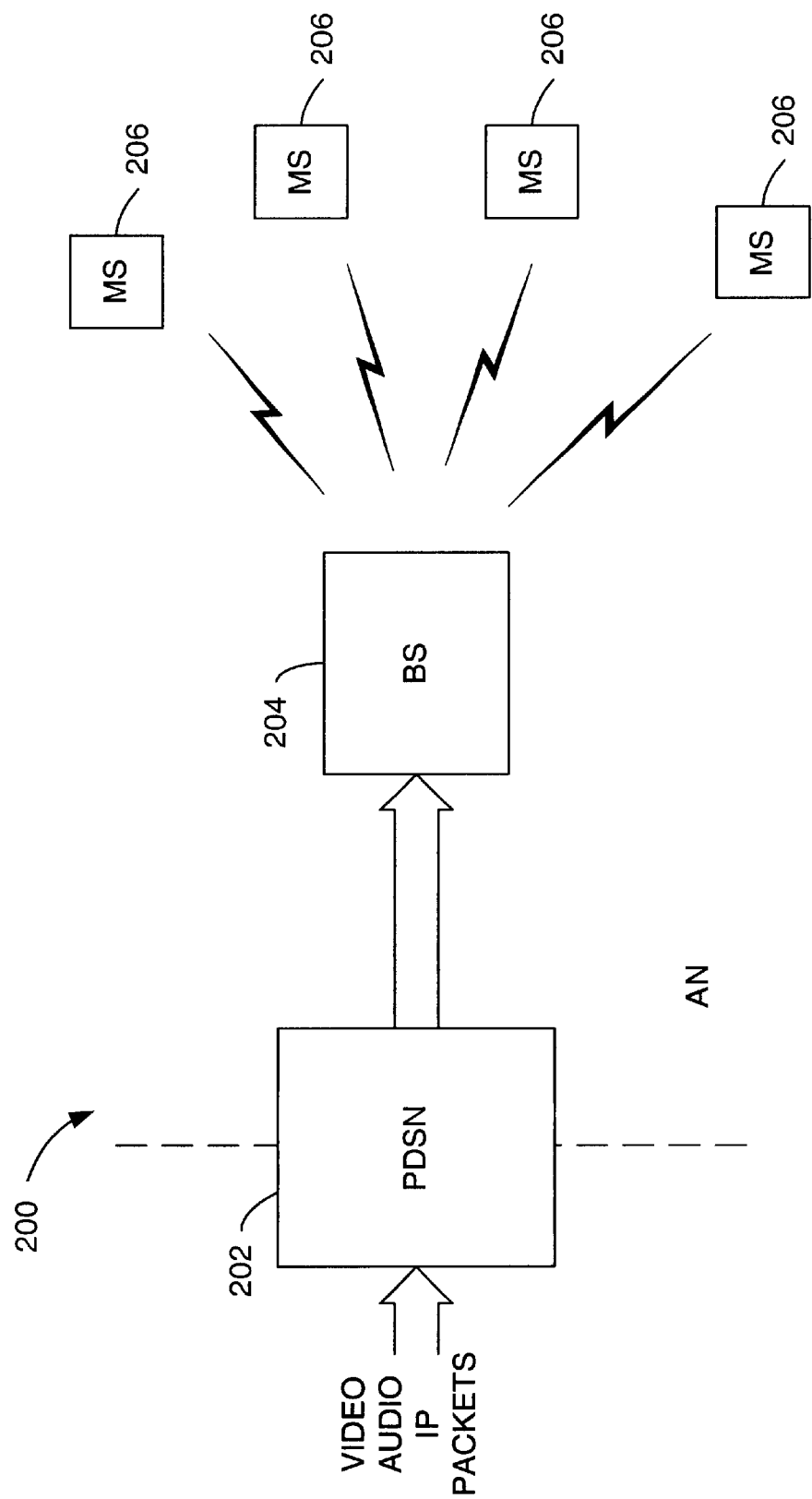
FIG. 2 is a block diagram of the communication system supporting broadcast transmissions.

A wireless communication system 200 is illustrated in FIG. 2, wherein video and audio information is provided to PDSN 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple Mobile Stations (MS), 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" refers to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single CDMA channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as a Content Server (CS), wherein the CS advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast content may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the Forward Broadcast Supplemental Channel (F-BSCH) supporting a payload of 64 kbps (excluding RTP overhead). The F-BSCH may also be modified to support other payload rates, for example, by subdividing the 64-kbps payload rate into sub-streams of lower rates.

One embodiment also supports group calls in several different ways. For example, one method is to use existing unicast channels, i.e., one forward link channel per MS with no sharing of F-FCH (or the F-DCCH). In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the F-BSCH of the exemplary embodiment may use a very large portion of a base station's forward link power to provide adequate coverage. The physical layer design of HSBS is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, and hence a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing of the relative importance between video quality and data throughput versus coverage is subjective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, which provides an acceptable video quality; (2) for streaming video services, the payload rate is assumed to include the 12 8-bit bytes per packet overhead of the Real-time Transport Protocol (RTP) packets; (3) the average overhead for all layers between RTP and the physical layer is approximately 64, 8-bit bytes per packet plus 8 bits per F-SCH frame overhead used by the Multiplex Packet Data Unit (MUXPDU) header.

In the exemplary embodiment, for non-video broadcast services, the maximum rate supported is 64 kbps. However, many other possible payload rates below 64 kbps are also achievable.

Subscription Model

There are several possible subscription/revenue models for HSBS service, including free access, controlled access, and partially controlled access. For free access, no subscription is needed by the customer to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
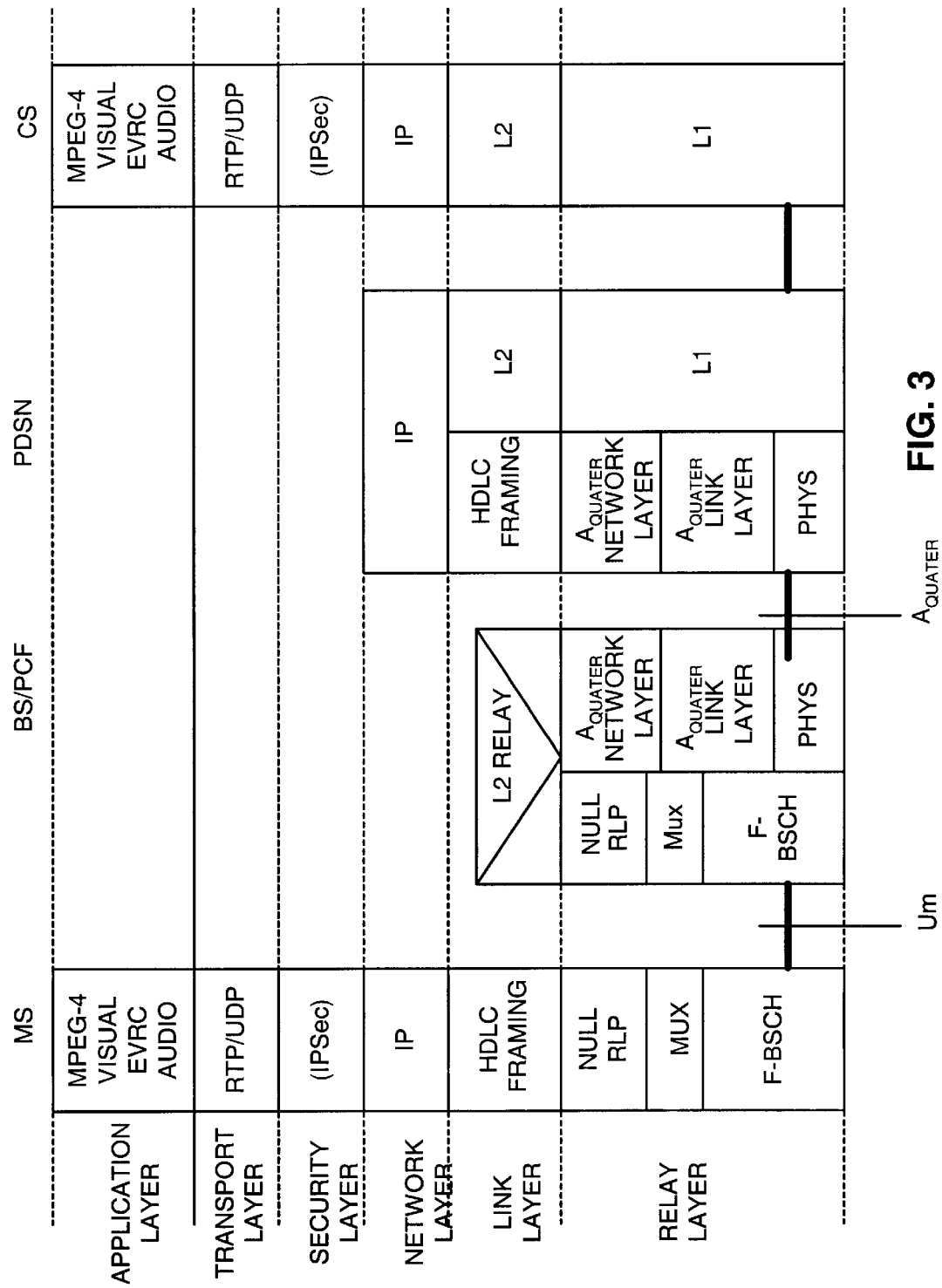
FIG. 3 is a model of the protocol stack corresponding to a broadcast service option in a wireless communication system.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and Content Server (CS) in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port. The security layer of the MS is specified by the protocol, wherein security parameters are provided via out-of-band channels when the security is initially associated with the CS. The network layer specifies the IP header compression parameters.

Message Flow

Figure 5:
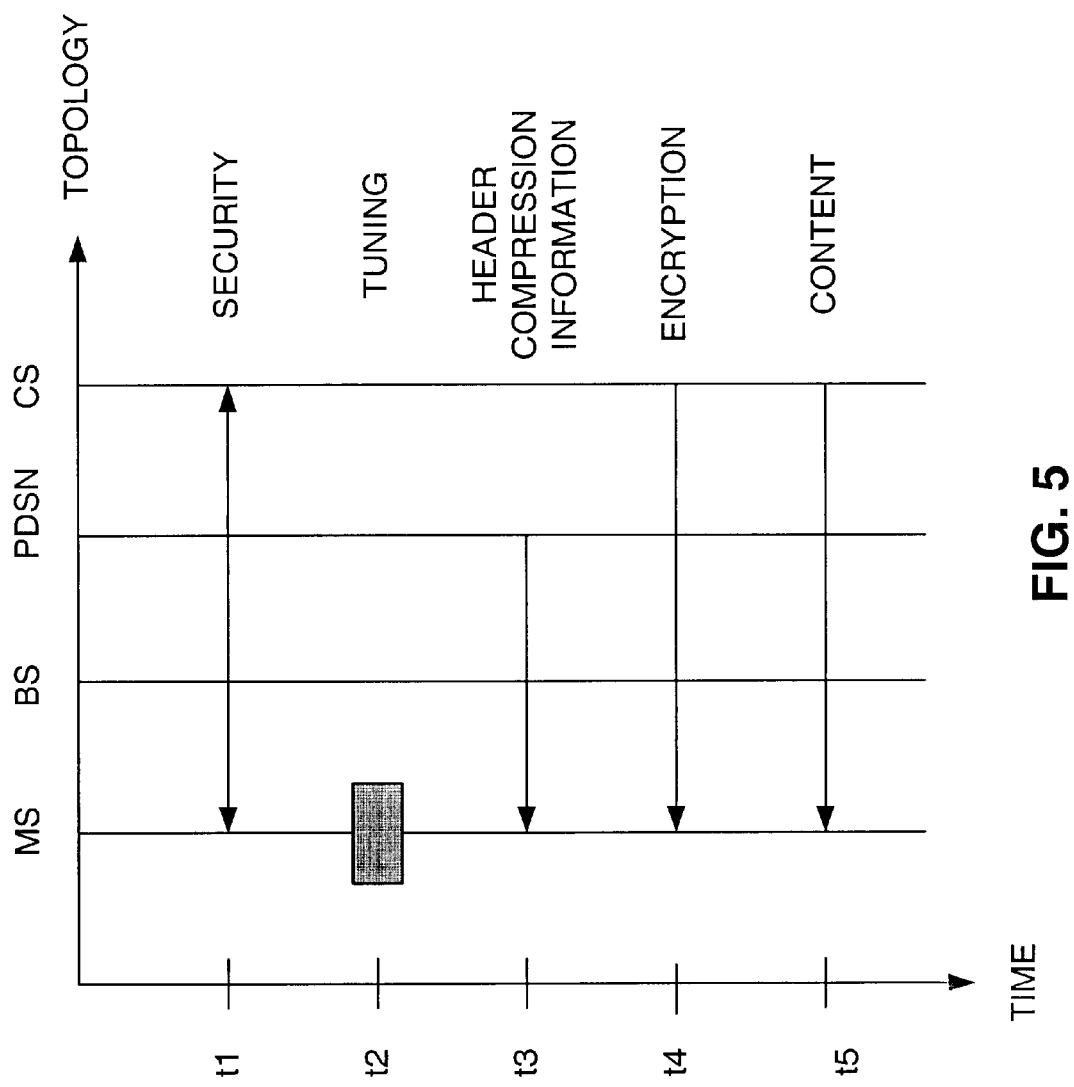
FIG. 5 is a flow diagram for a message flow for broadcast service in a wireless communication system topology.

FIG. 5 illustrates the call flow of the exemplary embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to the exemplary embodiment, the CS provides the encryption information over a dedicated channel during a packet data session, such as via Point-to-Point Protocal (PPP), WAP, or other out-of-band methods.

At time t2 the MS tunes into the broadcast channel and starts to receive packets. At this point in time, the MS is unable to process the received packets because the IP Encapsulating Security Payload (IP/ESP) header is compressed via Robust Header Compression (ROHC), and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Compression

According to the exemplary embodiment, broadcast content is transmitted on a dedicated broadcast channel. The transport layer provides encryption overhead for carrying broadcast content in IP packets. The system supports data compression, and specifically header compression. The decision to compress data depends on the required average throughput (including transport/encryption overhead, data link layer overhead, and physical layer overhead) and user perception of the broadcast quality. Carrying more broadcast content in each IP packet reduces overhead and thus reduces the broadcast channel bandwidth. In contrast, compression increases the Packet Error Rate (PER) that affects user perception. This is due to the transmission of each long IP packet spanning multiple physical layer frames and thus is associated with increases in the Frame Error Rate (FER). If a carrier decides to use small IP packets to improve broadcast quality, the carrier may choose header compression to reduce the transport and encryption overhead of the IP packet.

The RTP/UDP/IP protocols are used to transport broadcast content from the CS to MS, and the content is protected by the Encapsulating Security Payload (ESP) in transport mode. The transport overhead is the RTP/UDP/IP header and is 40 bytes per IP packet data. The encryption overhead is in the form of ESP header, Initialization Vector (IV), and ESP trailer. The ESP header and IV are inserted between the IP header and UDP header. The ESP header consists of the Security Parameter Index (SPI) (4 bytes) and Sequence Number (4 bytes). The length of IV is specific to which encryption algorithm is used. For the Advanced Encryption Standard (AES) Cipher Algorithm, the length of IV is 16 byte. The ESP trailer is appended to the end of the UDP datagram and consists of the padding, next header (1 byte), and padding length (1 byte). Since the cipher block size of the ABS algorithm is 16 bytes, the padding size ranges from 0 to 15 bytes. The ceiling function of the average padding size yields 8 bytes. For an IP packet the total overhead due to transport and encryption ranges from 66 to 81 bytes with the average of 74 bytes not including the data link layer overhead from the PDSN to the MS.

Header compression such as the Robust Header Compression (ROHC) may be used to reduce the IP header and the SPI field of the ESP Header from 24 bytes to 2 bytes. The Sequence Number of the ESP header is not compressed, because it is used to sequence the compressed packets. The IV is not compressed, because it changes randomly for every packet. The UDP/RTP header and ESP trailer cannot be compressed because they are encrypted. Therefore, if ROHC is used to compress the IP/ESP header, the average overhead due to transport and encryption is reduced from 74 bytes to 52 bytes per IP packet.

Figure 8:
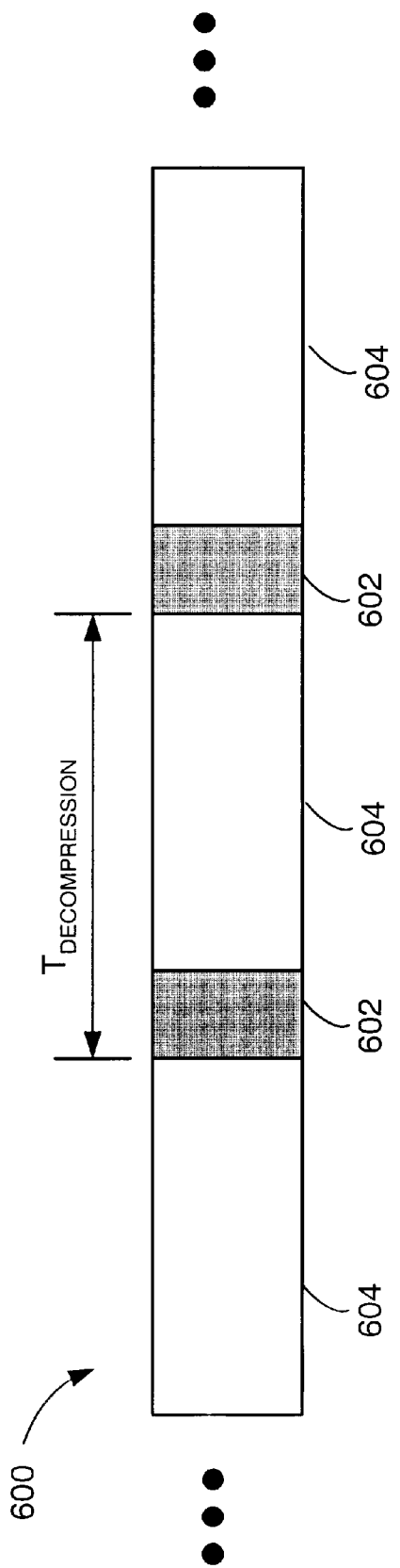
FIG. 8 is a periodic broadcast of header compression information.

According to the exemplary embodiment, header compression, such as the Robust Header Compression (ROHC), is applied so as to avoid propagating decompression errors. As illustrated in FIG. 7, the header information is compressed from 24 bytes down to 2 bytes. The header 500 includes an IP header 502 and a SPI portion 504. The compression algorithm results in a 2-byte result after compression. In contrast to conventional header compression, wherein some type of negotiation is required between the MS and the PDSN or other infrastructure element, the exemplary embodiment provides a uni-directional transmission of compression information. The MS does not need to request the compression information, i.e., header compression parameters sufficient for decompression of the received information at the MS. Rather, the PDSN provides the compression information periodically as illustrated in FIG. 8. The PDSN provides the compression information on the broadcast channel interspersed with broadcast content. The provision of control information within a data stream is referred to as "in-band" as a separate channel is not required. As illustrated, the broadcast stream 600 includes broadcast content portions 604 and decompression information, i.e., compression information, 602. The decompression information is provided having a period of $T_{DECOMPRESSION}$. Alternate embodiments may provide the decompression information on occurrence of a predetermined event rather than periodically. As the MS does not request the decompression information, the PDSN supplies the information with a frequency that prevents delays in accessing the broadcast content. In other words, the PDSN should provide the information often, so that an MS may access the broadcast at any time without having to wait for decompression information.

Note that ROHC may be operated in a unidirectional mode, wherein, packets are sent in one direction only: from compressor to decompressor. In this mode, therefore, makes ROHC usable over links wherein a return path from decompressor to compressor is unavailable or undesirable. Before the MS can decompress packets received from the broadcast channel, the state of decompressor is initialized. The Initialization & Refresh (IR) packet is used for this purpose. There are two alternatives for the ROHC initialization.

The subscriber "tunes" to the broadcast channel and waits for the ROHC IR packets periodically sent by the ROHC compressor in the PDSN. Frequent ROHC IR packets may be needed for the MS to start decompressing received packets quickly. Frequent ROHC IR packets may use too much bandwidth in the broadcast channel. An IR packet is about 30 bytes for the IP/ESP compression profile. If an IR packet is sent once every 250 ms., the process consumes about 1 kbps in the broadcast channel. Losing IR packets over the air would further delay the MS to acquire ROHC initialization.

If decompression goes out-of-sync, due to packet loss, or residual error in the received compressed header, or failure, etc., the resultant decompression error may propagate until decompression is re-synchronized or re-initialized. An ROHC compressed header contains a Cyclic Redundant Check (CRC), which is calculated over the entire header before compression. This CRC allows decompression to perform a local context repair that brings the context in sync (in the events of packet loss and residual error). When decompression recovers from a failure, periodic IR packets effectively re-initialize the decompression process.

Data Link Layer

A data link layer framing protocol or transport layer protocol is applied between the PDSN and the MS to delineate packets received from the broadcast channel. With reference to FIG. 3, information in the transport layer, identified as LINK LAYER, is provided between the PDSN and the MS. The framing information is generated at the PDSN and is provided to the MS via the BS. The PDSN receives IP streams from the CS and frames the IP streams according to a predetermined framing protocol. As illustrated in the exemplary embodiment, the PDSN applies a framing protocol version of the High-Level Data Link Control (HDLC). The HDLC corresponds to Layer 2 of the Open Systems Interconnection (OSI) Reference Model 7-layered architecture, wherein Layer 2 is referred to as the Data Link Layer. The HDLC protocol seeks to provide error-free movement of data between network nodes. To this end, the HDLC layer is designed to ensure the integrity of data passed to a next layer. In other words, the framing protocol seeks to reproduce the data received exactly as the data was originally transmitted, without errors, without loss of information, and in the correct order.

Figure 9:
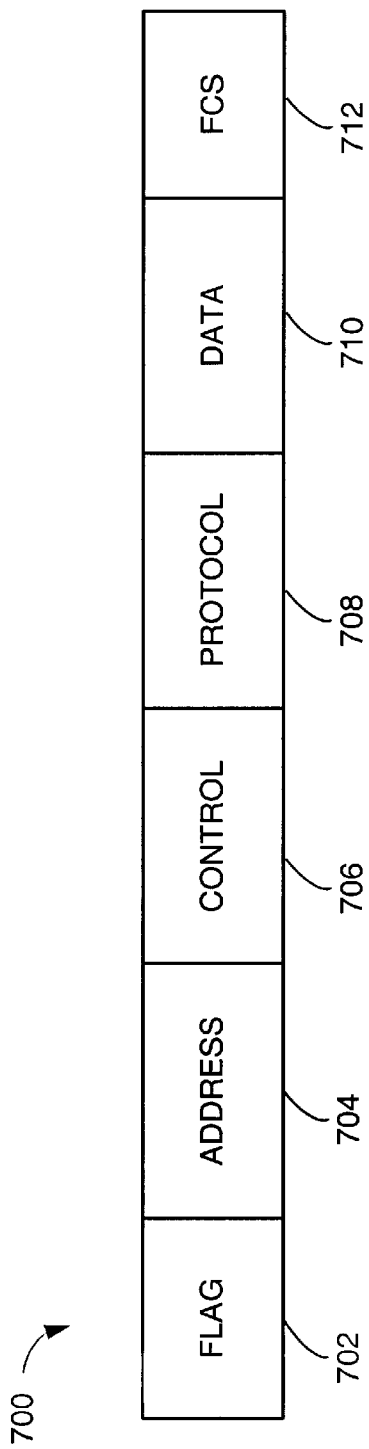
FIG. 9 is a header compression protocol.

The exemplary embodiment applies a version of HDLC framing that applies a subset of the HDLC defined parameters. FIG. 9 illustrates one embodiment of HDLC framing, wherein frame 700 includes a plurality of fields as defined by the HDLC protocol outlined in RFC 1662. Field 702 defines a FLAG or indication of a start of frame. The FLAG has a designated bit length and is defined by a predetermined pattern of bits. The HDLC is convenient to apply as the HDLC is a commonly available standardized protocol. One disadvantage of the full HDLC framing protocol is the processing time required to generate the frames at the transmitter and to retrieve the frames at the receiver.

In particular, the HDLC protocol is considered processor intensive as further processing is used to ensure the payload does not include the same sequence of bits as the FLAG. At the transmitter, if a FLAG sequence of bits is detected in the payload, an escape character is inserted into the payload to identify the FLAG as part of the payload and not indicating a start of frame. The process of adding an escape character is referred to as "escaping" hexadecimal patterns of 0x7E and 0x7D in the frame payload. An alternative method referred to as the Efficient Framing Protocol that is less processor intensive than the HDLC-like framing is described hereinbelow. FIG. 9 illustrates the options of using HDLC framing to transport PPP frame. For the HSBS operation, the HDLC-like framing overhead can be reduced by eliminating field that are not required, or have little meaning and/or provide little information, for a uni-directional broadcast. As described hereinabove, the FLAG is a predetermined sequence of bits indicating the beginning of an HDLC frame. The exemplary embodiment incorporates a FLAG or other start of frame indicator 802, as illustrated within the format 800 of FIG. 10. In contrast to the format of FIG. 9, the end of a frame is not indicated with overhead information in the exemplary embodiment. As the address and control fields of the format 700 have static values, these are not included in the format 800.

Figure 10:
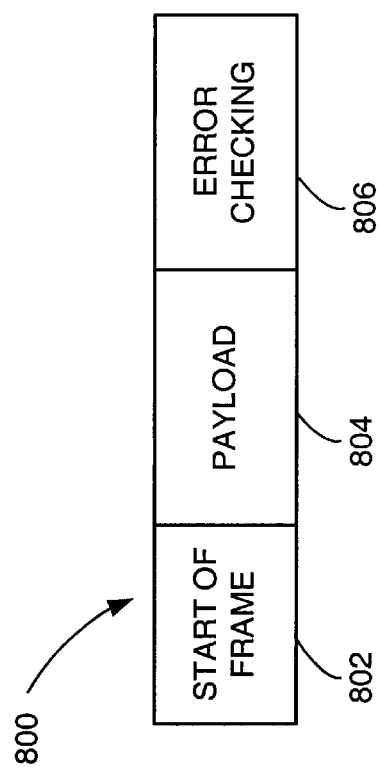
FIG. 10 is a header compression protocol for broadcast service in a wireless communication system.

Continuing with FIG. 10, as the purpose of the Protocol field 708 (FIG. 9) is to identify the payload type, such as Link Control Protocol (LCP) packet, ROHC packet, IP packet, etc., this discriminator is not required for broadcast operation as all packets in the broadcast channel belong to the same type. For example, if ROHC compression is used for packet transmission, all packets in the broadcast channel are processed as ROHC packets. The types of ROHC packets, such as IR packet, compressed packet, etc., are distinguished by the Packet Type field in the ROHC packet header. Therefore, the Protocol field is not included in format 800. Further, the format 800 includes an error checking field 806 after the payload 804. The error checking field 806 provides information to the receiver to allow the receiver to check for errors in the received payload. The exemplary embodiment incorporates a Frame Check Sum (FCS) which may be specified as null, 16 bits, or 32 bits. Since an HDLC frame may span multiple physical-layer frames in the broadcast channel, it is recommended to use a 16-bit FCS.

The octet stuffing procedure defined in RFC 1662 is also applied to the exemplary embodiment, wherein after the FCS computation, the HDLC transmitter in the PDSN examines each byte in the HDLC frame (excluding the Flag) for the patterns of 0x7E and 0x7D. The pattern 0x7E will be encoded as 0x7D and 0x5E, and the pattern 0x7D will be encoded as 0x7D and 0x5D. The HDLC transmitter will not encode any other patterns. This implies that the Async-Control-Character-Map (ACCM) as defined in RFC 1662 is set to all zero.

The HDLC framing overhead is 3 bytes plus the octet stuffing overhead. Assuming the byte pattern is uniformly distributed, the average octet stuffing overhead is one byte per 128-byte of HDLC frame. For example, if the payload is 256 bytes, the HDLC framing overhead is 5 bytes on the average.

Figures 11, 12:
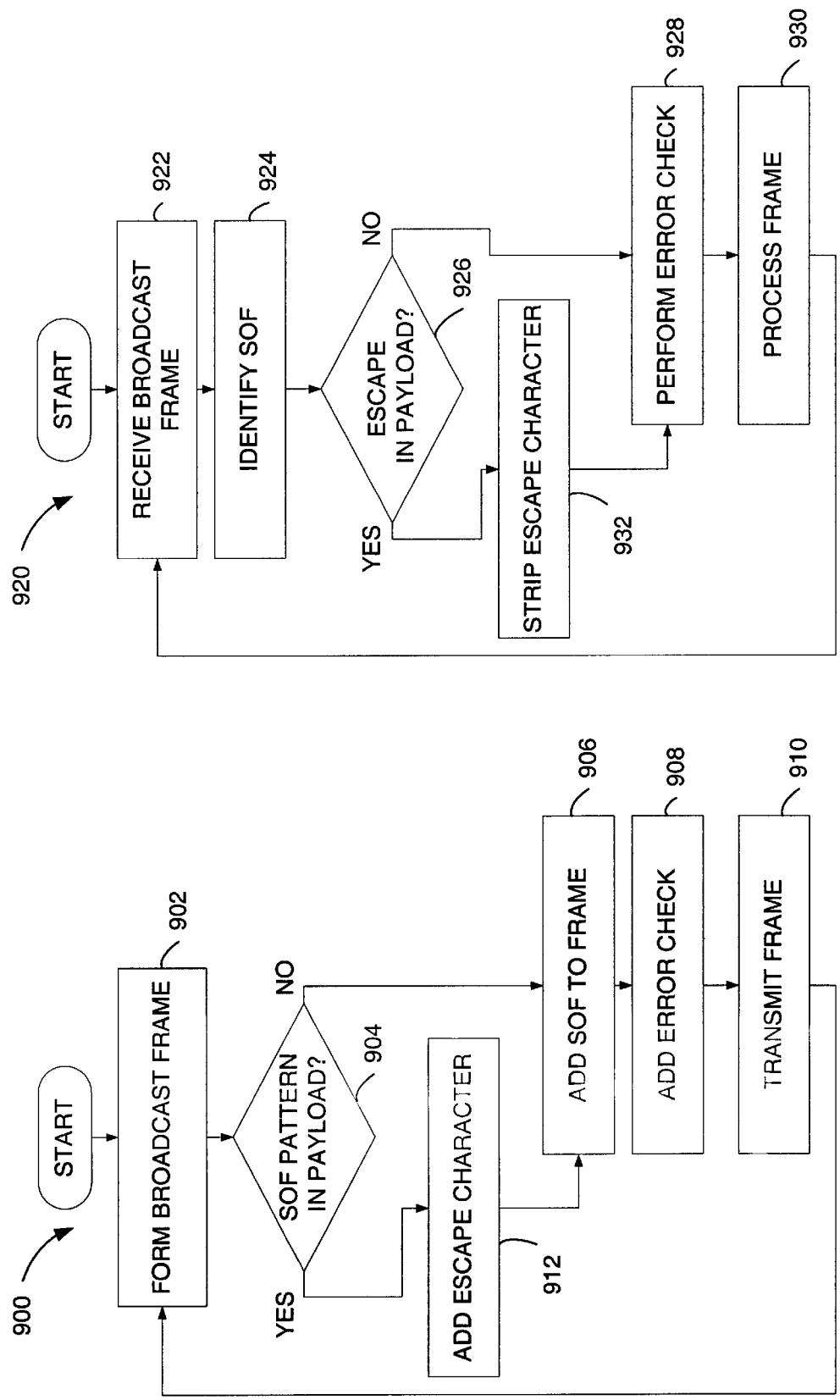
FIG. 11 is a flow chart of header compression for broadcast service in a wireless communication system.
FIG. 12 is a flow diagram of header decompression for broadcast service in a wireless communication system.

FIG. 11 is a flow diagram of a framing method 900 performed at the transmitter. The transmitter forms the broadcast frame at step 902 by determining a payload portion of the packetized data and generating a Start Of Flag (SOF). The transmitter then checks the frame for any SOF sequences contained in the payload 904. If an SOF sequence is found in the payload, the transmitter adds an escape character at step 912. Else, the transmitter appends the SOF to the payload at step 906 and provides an error checking mechanism at step 908. The frame is transmitted at step 910. The transmitted frame has the format 800 of FIG. 10. Alternate embodiments may implement other fields within the framing format and may incorporate any form of classifier to locate a SOF sequence in the payload.

FIG. 12 is a flow diagram of a de-framing method 920 performed at the receiver. The process starts on receipt of a broadcast frame at step 922. The receiver identifies a SOF at step 924, and checks for escape characters in the payload at decision diamond 926. If an escape character, or other SOF sequence identifier, is found in the payload, the receiver strips the escape character at step 932. Else, the receiver performs an error check at step 928 and processes the frame at step 930.

Access Network

Figure 13:
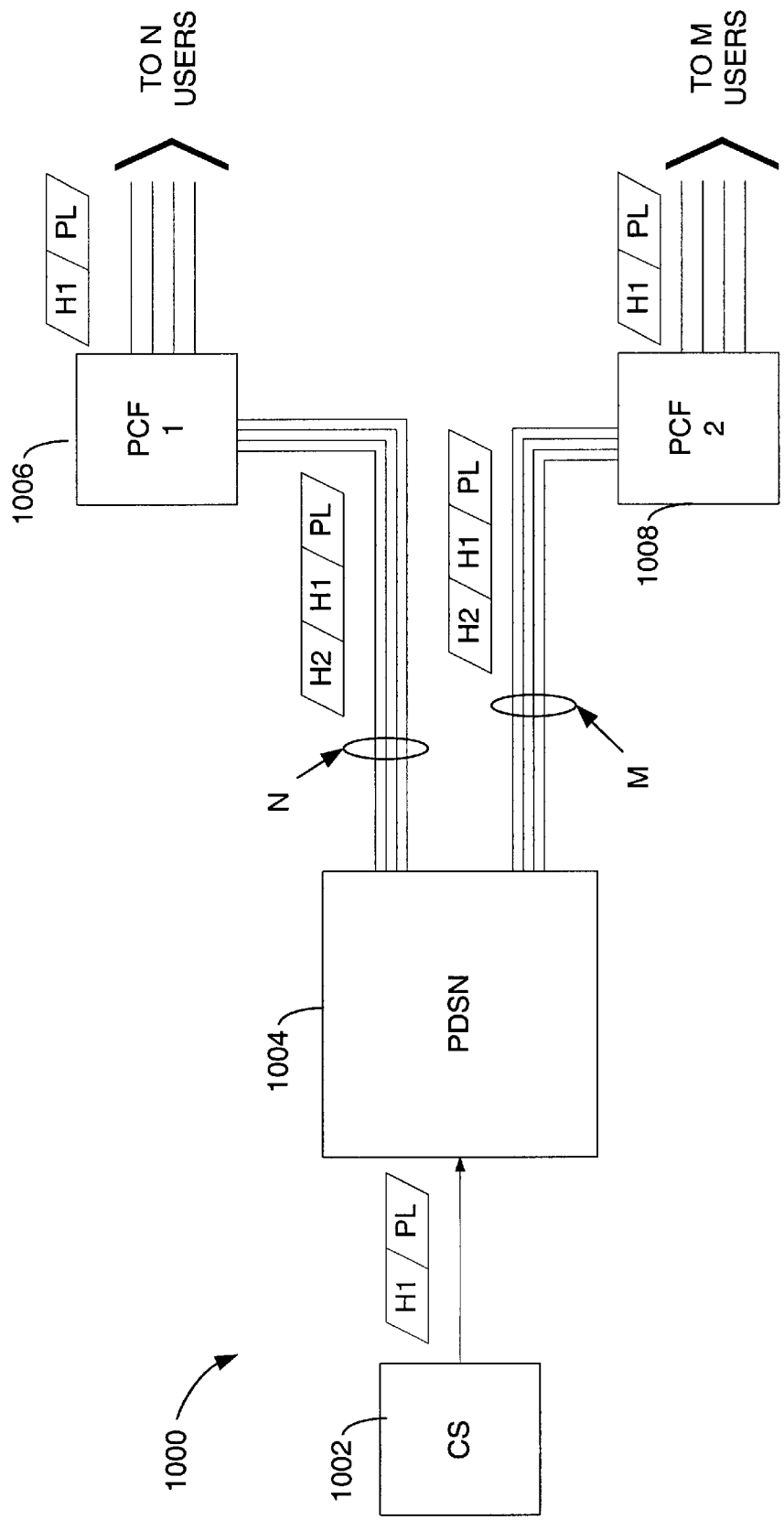
FIGS. 13–15 are access networks supporting broadcast transmissions.

A general access network topology for a system 1000 is illustrated in FIG. 13 having a CS 1002, a PDSN 1004, and two PCF:PCF1 1006 and PCF2 1008. FIG. 13 includes packet diagrams describing the transmissions from each of the infrastructure elements illustrated in the system 1000. As illustrated, the CS 1002 prepares an IP packet of information and transmits the packet in at least one frame, having a payload and inner header, H1. The inner header has source and destination information, wherein the source identifies the CS 1002 and the destination identifies a subscription group. The CS 1002 transmits the frame to the PDSN 1004, which maps the destination subscription group to individual subscribers in a set of active users.

The PDSN 1004 determines the number of individual users in the active set that are in the destination subscription group and duplicates the frame received from the CS 1002 for each of those users. The PDSN 1004 determines the PCF(s) corresponding to each of the users in the subscription group. The PDSN 1004 then appends an outer header, H2, to each of the prepared frames, wherein H2 identifies a PCF. The PDSN 1004 then transmits the frames to the PCF(s). The transmission from the PDSN 1004 includes the original payload, the header H1, and the Header H2. As illustrated, the PDSN 1004 sends N transmission frames to PCF1 1006 and sends M transmission frames to PCF2 1008. The N transmission frames correspond to N users in the subscription group serviced via PCF1 1006 and the M transmission frames correspond to M users in the subscription group serviced via PCF2 1008. In this scenario, the PDSN 1004 duplicates received frames any number of times for transmission to the corresponding subscribers.

Figure 14:
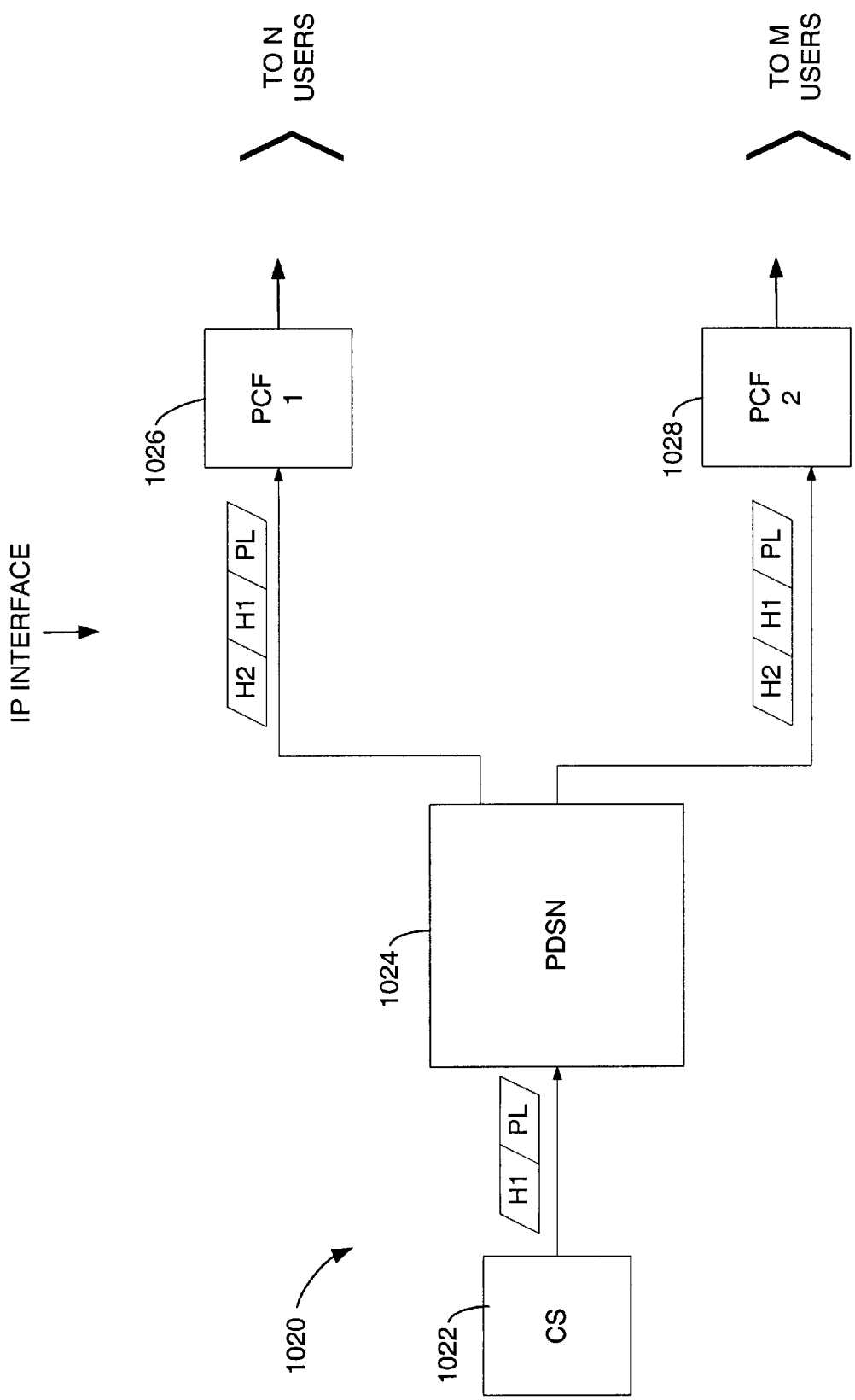

FIG. 14 illustrates an exemplary embodiment of a system 1020 having a CS 1022 communicating with PCF1 1026 and PCF2 1028 via PDSN 1024. As illustrated, the CS 1022 prepares an IP packet of information and transmits the packet in at least one frame, having a payload and inner header, H1. The inner header has source and destination information, wherein the source identifies the CS 1022 and the destination identifies a subscription group. The CS 1022 transmits the frame to the PDSN 1024, wherein the PDSN 1024 appends an outer header, H2, wherein H2 routes the frame to at least one PCF. The PDSN 1024 then transmits the frames to the PCF(s). The transmission from the PDSN 1024 includes the original payload, the header H1, and the Header H2. As illustrated, the PDSN 1024 sends one transmission frame to PCF1 1026 and sends one transmission frame to PCF2 1028. The PCF1 1026 sends one transmission frame to the N users in the subscription group. The PCF2 1028 sends one transmission frame to the M users in the subscription group.

According to an exemplary embodiment, the broadcast CS sends IP packets containing encrypted broadcast content to a multicast group identified by a class-D multicast IP address. This address is used in the destination address field of the IP packets. A given PDSN 1024 participates in multicast routing of these packets. After header compression, the PDSN 1024 places each packet in an HDLC frame for transmission. The HDLC frame is encapsulated by a Generic Routing Encapsulation (GRE) packet. The key field of the GRE packet header uses a special value to indicate a broadcast bearer connection. The GRE packet is appended with the 20-byte IP packet header having a source address field identifying the IP address of the PDSN 1024, and destination address field uses a class-D multicast IP address. It is recommended that this multicast IP address is different from the one used by the broadcast CS. The system 1020 configures at least one multicast routing table of the respective PCFs and PDSNs. The packets delivered in the broadcast connection are provided in sequence; in the exemplary embodiment the GRE sequencing feature is enabled. Duplication of the IP multicast packets is done in multicast-capable routers.

Figure 15:
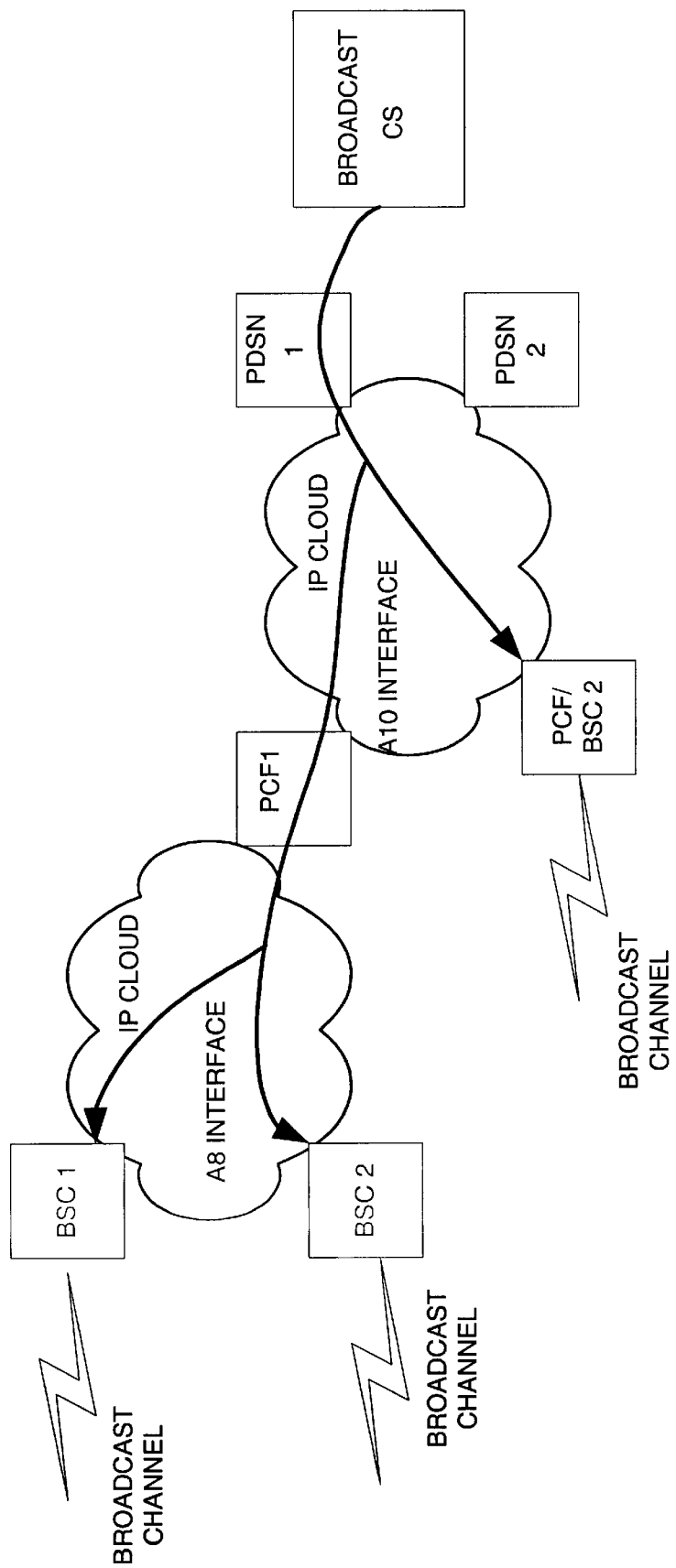

In an exemplary embodiment, each PCF is further coupled to a BSC (not shown), wherein a given BSC may duplicate the packets and send them to another BSC. The chaining of BSCs yields better soft handoff performance. The anchoring BSC yields better soft handoff performance. The anchoring BSC duplicates the transmission frame and sends it with the same time-stamp to its adjacent BSCs. The time-stamp information is critical to the soft handoff operation as the mobile station receives transmission frames from different BSCs. The exemplary embodiment is also illustrated in FIG. 15, wherein the interface between the PDSN and PCF is identified as an IP interface or IP cloud, labeled A10 interface. The interface between the PCF and the BSC is identified as an IP interface or IP cloud, labeled A8 interface. The BSC are then coupled to the Broadcast Channel.

According to an alternate embodiment, the broadcast service is sent to all BSCs reachable by a same PCF. Consider the case wherein PCF1 is able to communicate with multiple BSCs via IP interface, and PCF2 is integrated with a BSC. Upon receiving IP packets from PDSN 1024, PCF1 changes the source address field of the IP packets to PCF1 IP address and forwards the packets for broadcast appropriately. The packets delivered in the broadcast must be in sequence. The multicast router in the IP interface (not shown) will duplicate packets in the broadcast. Upon receiving IP packets via the IP interface, respective BSCs remove the IP/GRE header and recover the HDLC frames. The BSCs then send the frames to the broadcast channel over the air interface. Similarly, PCF2 integrated with a BSC will recover HDLC frames from the IP interface and send them to the broadcast channel over the air interface. This alternate presents a problem in soft-handoff, as the broadcast packets forwarded by the same PCF arrive at different BSCs a synchronously causing synchronization problems during inter-BSC soft handoff.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting Internet Protocol packets in a wireless transmission system supporting broadcast transmissions, the method comprising:
    generating a first transmission frame;
    transmitting the first transmission frame with an inner header identifying the source and destination of the first transmission frame, wherein the destination identifies multiple target recipients; and
    applying an outer header to the first transmission frame and inner header, the outer header identifying a multicast group destination for the first transmission frame, wherein the multicast group destination specifies at least one intermediate control entity that controls the transmission of the packets between a packet data serving node and a base station.

2. The method as in claim 1, wherein generating a first transmission frame further comprises:
    compressing the inner header.

3. The method as in claim 1, further comprising:
    Multicast routing the first transmission frame to multiple target recipients.

4. The method as in claim 3, wherein the first transmission frame is part of a broadcast stream of information, and wherein the multiple target recipients are subscribers to the broadcast stream of information.

5. A method for processing Internet Protocol packets in a wireless transmission system supporting broadcast transmissions, the method comprising:
    receiving a first transmission frame having an inner header identifying the source and destination of the first transmission frame, wherein the destination identifies multiple target recipients;
    applying an outer header to the first transmission frame and inner header, the outer header identifying a multicast group destination for the first transmission frame, wherein the multicast group destination specifies at least one intermediate control entities that controls the transmission of the packets between a packet data serving node and a base station; and
    transmitting the first transmission frame with the outer header and inner header to the multicast group.

6. The method as in claim 5, wherein the first transmission frame is part of a broadcast stream of information, and wherein the multiple target recipients are subscribers to the broadcast stream of information.

7. An infrastructure element for processing Internet Protocol packets in a wireless transmission system supporting broadcast transmissions, the infrastructure element comprising:
    means for receiving a first transmission frame having an inner header identifying the source and destination of the first transmission frame, wherein the destination identifies multiple target recipients;
    means for applying an outer header to the first transmission frame and inner header, the outer header identifying a multicast group destination for the first transmission frame, wherein the multicast group destination specifies at least one intermediate control entity that controls the transmission of the packets between a packet data serving node and a base station; and
    means for transmitting the first transmission frame with the outer header and inner header to the multicast group.

8. A digital signal storage device, comprising:
    first set of instructions for receiving a first transmission frame having an inner header identifying the source and destination of the first transmission frame, wherein the destination identifies multiple target recipients;
    second set of instructions for applying an outer header to the first transmission frame and inner header, the outer header identifying a multicast group destination for the first transmission frame, wherein the multicast group destination specifies at least one intermediate control entity that controls the transmission of the packets between a packet data serving node and a base station; and
    third set of instructions for transmitting the first transmission frame with the outer header and inner header to the multicast group.

9. In a wireless communication system supporting a broadcast service, a communication signal transmitted via a carrier wave, the communication signal having a plurality of transmission frames, each of the plurality of transmission frames comprising:
    a payload of broadcast content;
    an inner header identifying a source and a destination of the payload, wherein the destination identifies multiple target recipients; and
    an outer header identifying a multicast group destination for the payload, wherein the multicast group destination specifies at least one intermediate control entity that controls the transmission of the packets between a packet data serving node and a base station.

10. An infrastructure element for processing Internet Protocol packets in a wireless transmission system supporting broadcast transmissions, the infrastructure element comprising:
    means for receiving a first transmission frame, the first transmission frame having:

an inner header identifying the source and destination of the first transmission frame, wherein the destination identifies multiple target recipients; and an outer header identifying a multicast group destination for the first transmission frame, wherein the multicast group destination specifies at least one intermediate control entity that controls the transmission of the packets between a packet data serving node and a base station;

means for determining a set of other infrastructure elements that requires the first transmission frame based on the outer header;

means for creating a duplicate transmission frame from the first transmission frame; and means for sending the duplicate transmission frame to the set of other infrastructure elements.

11. A digital signal storage device comprising:

first set of instructions for receiving a first transmission frame, the first transmission frame comprising:

an inner header identifying the source and destination of the first transmission frame, wherein the destination identifies multiple target recipients; and an outer header identifying a multicast group destination for the first transmission frame, wherein the multicast group destination specifies at least one intermediate control entity that controls the transmission of the packets between a packet data serving node and a base station;

second set of instructions for determining a set of other infrastructure elements that requires the first transmission frame based on the outer header;

third set of instructions for creating a duplicate transmission frame from the first transmission frame; and fourth set of instructions for sending the duplicate transmission frame to the set of other infrastructure elements.

* * * * *